N. MARTINEZ.
TRANSMISSION MECHANISM.
APPLICATION FILED FEB. 12, 1916.

1,191,019.

Patented July 11, 1916.

Witnesses

Inventor
Norberto Martinez
By Victor J. Evans
Attorney

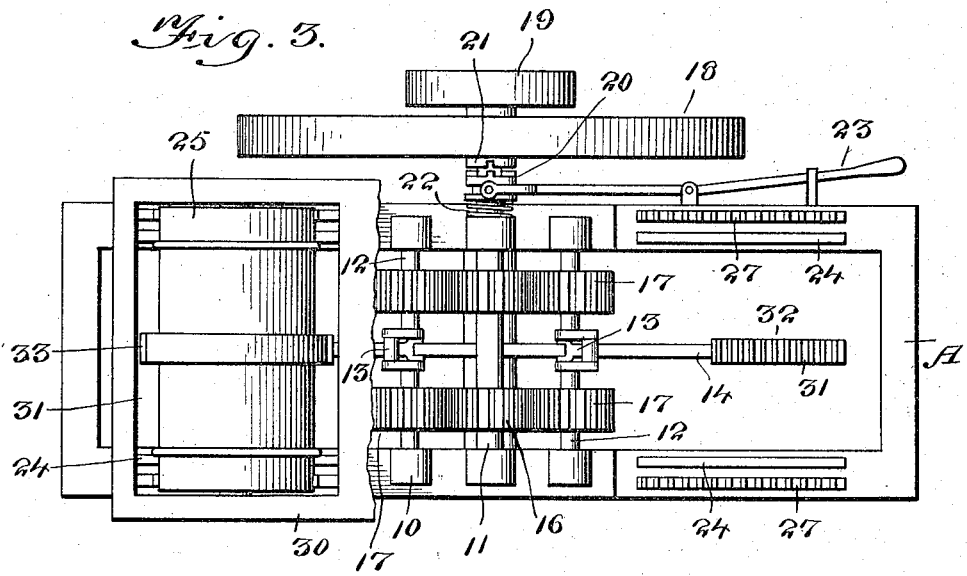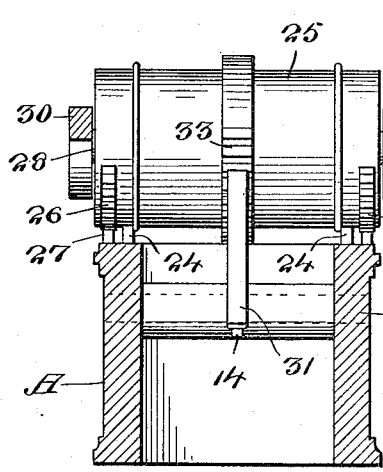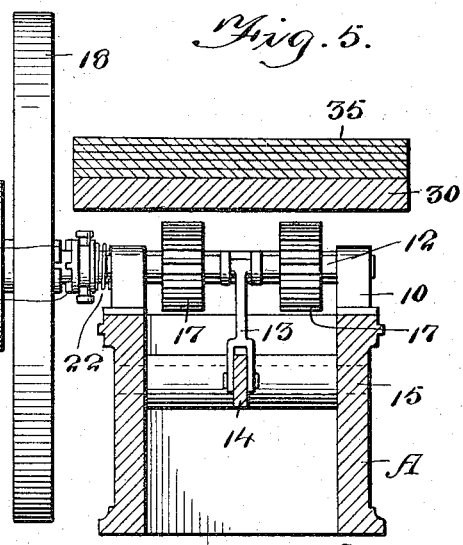

UNITED STATES PATENT OFFICE.

NORBERTO MARTINEZ, OF COTULLA, TEXAS.

TRANSMISSION MECHANISM.

1,191,019.  Specification of Letters Patent.  Patented July 11, 1916.

Application filed February 12, 1916. Serial No. 77,892.

*To all whom it may concern:*

Be it known that I, NORBERTO MARTINEZ, a citizen of Mexico, residing at Cotulla, in the county of La Salle and State of Texas, have invented new and useful Improvements in Transmission Mechanism, of which the following is a specification.

The invention relates to transmission mechanism, and more particularly to the class of improvements in the structure forming the subject matter of Letters Patent No. 1,112,375, issued to me on or about the 29th day of September, 1914, and also a subsequent application covering the same subject matter and allowed January 26, 1916.

The primary object of the invention is the provision of transmission mechanism of this character wherein a minimum number of parts is employed and the working thereof is uniform and steady, with increased or multiplied power and without decreasing the strength and durability of the mechanism.

Another object of the invention is the provision of transmission mechanism of this character wherein reciprocatory movement is converted into rotary motion with multiplied power or vice versa and all possibility of lost motion is eliminated.

A further object of the invention is the provision of mechanism of this character which is simple in construction, thoroughly reliable and efficient in operation, strong, durable and inexpensive in manufacture.

Other objects of the invention will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings Figure 1 is a side elevation of transmission mechanism constructed in accordance with the invention; Fig. 2 is a vertical longitudinal sectional view thereof; Fig. 3 is a top plan view, with the reciprocatory platform or table partly broken away; Fig. 4 is a sectional view on the line 4—4 of Fig. 1; and Fig. 5 is a sectional view on the line 5—5 of Fig. 1.

Similar reference characters indicate corresponding parts throughout the several views of the drawings.

Referring to the drawings in detail, the transmission mechanism comprises a base A, which is preferably in the form of a frame, and has mounted centrally thereof, at its top, a plurality of bearings 10, in a pair of which is journaled a main or power transmitting shaft 11, while in the other bearing, on opposite sides of the shaft 11, are journaled crank shafts 12, to the cranks of which are pivotally connected links 13 which are also pivoted to a walking beam 14 mounted centrally upon a rock shaft 15 journaled in the sides of the frame or base A, as shown. Fixed to the shaft 11 are gears 16 which mesh with gears or pinions 17 fixed to the shaft 12 so that on the rocking of the walking beam 14 motion will be imparted through the gears 16 and 17 to the main or transmission shaft 11 for the driving of the machinery or the like in a manner presently described.

Loosely supported upon the main or transmission shaft 11 is a fly wheel 18, and on the hub thereof is formed a belt pulley 19, the same being also loose upon the shaft 11, while splined or keyed for longitudinal sliding movement upon the shaft is a clutch member 20 which is adapted for locking engagement with a companion clutch member 21 formed on the hub of the fly wheel 18, and in this manner the said fly wheel is locked with the shaft 11 so that when a belt is trained over the pulley 19 the motion from the shaft 11 can be imparted to the machinery or the like. Surrounding the shaft 11 and working against the clutch member 20 is a coiled expansion spring 22 which serves to normally hold the clutch member in locked engagement with the clutch member 21 on the fly wheel 18, and connected with the clutch member 21 is a releasing lever 23 which permits the convenient throwing out of the clutch member 20 to permit the fly wheel 18 to become free on the shaft 11 when the occasion requires.

Formed on the sides of the frame A at the top thereof are track rails 24, on which travel rollers 25 which are formed with gear teeth 26 meshing with toothed racks 27 also formed on the side walls of the frame A at the top in spaced parallel relation to the track 24 thereon, the gear teeth 26 being extended peripherally thereof for substantially one-half of the diameter of the rollers 25. These rollers 25 are formed with axles 28 which are journaled in bearings 29 depending from a movable platform or table 30, which is formed with cut-away portions 31 accommodating the said rollers 25, the meshing gear teeth 26 and rack teeth 27 being designed to limit the movement of the platform or table 30 longitudinally of the base and also to avoid any possibility of the slipping of the rollers 25 upon the base.

Formed on the ends of the walking beam 14 are tread shoes or blocks 31, the upper edges of which are reversely beveled with respect to each other and are formed with rack teeth 32 adapted for meshing engagement with gear teeth 33 formed medially of the rollers 25 for only a portion of the diameters thereof. As the rollers 25 travel upon the beveled shoes or blocks 31 they cause the downward movement of the beam 14, and in this manner rotary motion is imparted to each shaft 12 so that reciprocatory motion is converted into rotary motion.

Formed on the table or platform 30, centrally thereof, is a weight frame 34, in which are held a series of removable weights 35 which prevent the possibility of the table or platform 30 leaving the base by the jumping of the rollers 25 from the track 24 upon said base. It will be obvious that on the forward and backward movements of the rollers 25 the beam 14 is oscillated because each roller operates upon one end thereof, causing a continuous rotation of the shaft 12, and from which similar motion will be imparted to the main shaft 11 which, through connection between it and the machinery, the latter will be driven. In converting the reciprocatory movement into rotary movement or vice versa it will be apparent that by reason of the particular arrangement of the parts the power of the apparatus is materially multiplied to give maximum force to the transmission mechanism without decreasing the driving energy.

From the foregoing description, taken in connection with the accompanying drawings, the construction and operation of my improved transmission mechanism will be readily understood and, therefore, a more extended explanation has been omitted.

Having thus described my invention, I claim:

1. In transmission mechanism, a base, a movable table superposed relative to the base, a rocking beam supported in the base, rollers journaled on the table and movable upon the base, tread shoes at opposite ends of the beam and acted upon by the rollers, and a rotary shaft having connection with the rocking beam and automatically driven thereby.

2. In transmission mechanism, a base, a movable table superposed relative to the base, a rocking beam supported in the base, rollers journaled on the table and movable upon the base, tread shoes at opposite ends of the beam and acted upon by the rollers, a rotary shaft having connection with the rocking beam and automatically driven thereby, and weights carried by the table.

3. In transmission mechanism, a base, a movable table superposed relative to the base, a rocking beam supported in the base, rollers journaled on the table and movable upon the base, tread shoes at opposite ends of the beam and acted upon by the rollers, a rotary shaft having connection with the rocking beam and automatically driven thereby, weights carried by the table, and rack toothed connections between the rollers and the shoes.

4. In transmission mechanism, a base, a movable table superposed relative to the base, a rocking beam supported in the base, rollers journaled on the table and movable upon the base, tread shoes at opposite ends of the beam and acted upon by the rollers, a rotary shaft having connection with the rocking beam and automatically driven thereby, weights carried by the table, rack toothed connections between the rollers and the shoes, and tracks on the base for the said rollers.

5. In transmission mechanism, a base, a movable table superposed relative to the base, a rocking beam supported in the base, rollers journaled on the table and movable upon the base, tread shoes at opposite ends of the beam and acted upon by the rollers, a rotary shaft having connection with the rocking beam and automatically driven thereby, weights carried by the table, rack toothed connections between the rollers and the shoes, tracks on the base for the said rollers, and rack toothed connections between the rollers and the said base.

In testimony whereof I affix my signature in presence of two witnesses.

NORBERTO MARTINEZ.

Witnesses:
H. U. PARKER,
BENNETT S. JONES.

Copies of this patent may be obtained for five cents each, by addressing the "Commissioner of Patents, Washington, D. C."